US006956874B1

(12) United States Patent
Moore et al.

(10) Patent No.: US 6,956,874 B1
(45) Date of Patent: Oct. 18, 2005

(54) METHOD AND SYSTEM FOR AUTOMATIC CONCATENATION DETECTION OF SYNCHRONOUS OPTICAL NETWORK (SONET) CHANNELS

(75) Inventors: Francois G. Moore, McKinney, TX (US); Edward W. Lam, Garland, TX (US)

(73) Assignee: Fujitsu Limited, Kawasaki (JP)

( * ) Notice: Subject to any disclaimer, the term of this patent is extended or adjusted under 35 U.S.C. 154(b) by 929 days.

(21) Appl. No.: 09/753,058

(22) Filed: Dec. 28, 2000

(51) Int. Cl.[7] .............................................. H04J 3/04
(52) U.S. Cl. ....................................... 370/535; 398/45
(58) Field of Search ................................ 370/389, 392, 370/503, 509, 216, 218; 398/43, 45, 48, 49, 398/50, 55, 56, 58

(56) References Cited

U.S. PATENT DOCUMENTS

| 6,125,104 A * | 9/2000 | Shiragaki et al. ............ 370/216 |
| 6,292,485 B1 * | 9/2001 | Trotta et al. ................ 370/389 |
| 6,353,593 B1 * | 3/2002 | Chen et al. ................. 370/216 |
| 6,751,743 B1 * | 6/2004 | Theodoras et al. .......... 713/400 |
| 6,765,933 B1 * | 7/2004 | Michel et al. .............. 370/539 |

OTHER PUBLICATIONS

"Synchronous Optical Network (SONET) Transport Systems: Common Generic Criteria," GR-253-CORE, Issue 2, Dec. 1995, with Revision 2, Jan. 1999; Bellcore, 1999, cover sheets, Contents, Lists of Figures, List of Tables pp. i-xvi, Preface pp. 1-2; pp. 1-1 through 8-58; Appendix A1-A134; Appendix B1-B8; Appendix C1-C52; Appendix D1-D28, References 1-14; Glossary 1-14, Requirement Object Index 1-12.

"For Telecommunications—Synchronous Optical Network (SONET)—Basic Description including Multiplex Structure, Rates, and Formats," American National Standards Institute, ANSI TI.105-1995, published 1995, cover sheets, Contents and Forward pp. i-ix; pp. 1-79.

* cited by examiner

Primary Examiner—Bob A. Phunkulh
(74) Attorney, Agent, or Firm—Baker Botts L.L.P.

(57) ABSTRACT

A method and system for automatic concatenation of synchronous optical network (SONET) channels includes receiving at a network element a SONET frame including a mandatory overhead and a plurality of channels for a bundled connection. A signal configuration of the channels in the bundled connection is automatically determined based on the mandatory overhead. The network element is automatically provisioned to cross-connect the channels in the bundled connection based on the signal configuration determined from the mandatory overhead.

22 Claims, 2 Drawing Sheets

# METHOD AND SYSTEM FOR AUTOMATIC CONCATENATION DETECTION OF SYNCHRONOUS OPTICAL NETWORK (SONET) CHANNELS

TECHNICAL FIELD OF THE INVENTION

This invention relates generally to the field of optical networks, and more particularly to a method and system for automatic concatenation detection of synchronous optical network (SONET) channels.

BACKGROUND OF THE INVENTION

Synchronous optical network (SONET) is an interface standard for transporting digital signals over fiber optical links that allows interworking of transmission products from multiple vendors. In SONET, data is transported in synchronous frames each having a number of defined channels. Network users, or customers, are assigned one or more of the channels. Customers may combine their channels to form a single, relatively high capacity connection, combine some of the channels to form several higher capacity connections or may independently use each channel as a discrete connection.

After a customer has determined its mix of channels into connections, the network provider provisions each node of the SONET network to provide cross-connects for the mix. This effort is tedious, time-consuming and subject to errors. This is especially true when the customer frequently changes its traffic mix, which requires the network provider to change provisioning of the SONET nodes along the transmission path of the connections.

Tandem Connection Management was developed within the SONET standard to alleviate this problem. Tandem Management Connection, however, is complex and utilizes optical overhead information not regularly used by customers or network providers. Accordingly, it is not generally implementable across network boundaries.

SUMMARY OF THE INVENTION

The present invention provides an improved method and system for automatic concatenation detection of synchronous optical network (SONET) channels that substantially reduce or eliminate problems with previous systems and methods. In particular, the present invention automatically provisions SONET cross-connects for a customer's traffic mix based on mandatory in-band signal information.

In accordance with one embodiment of the present invention, the method and system for automatic concatenation detection of SONET channels includes receiving at a network element a SONET frame including a mandatory overhead and a plurality of channels for a bundled connection. A signal configuration of the channels in the bundled connection is automatically determined based on the mandatory overhead. The network element is automatically provisioned to cross-connect the channels in the bundled connection based on the signal configuration determined from the mandatory overhead.

More specifically, in accordance with a particular embodiment of the present invention, the mandatory overhead comprises a line overhead. In this embodiment, the line overhead includes a synchronous transport signal (STS) payload pointer having concatenation indicators from which the signal configuration is determined. The channels comprise STS-1 or other suitable segments of the synchronous frame.

Technical advantages of the present invention include providing an improved method and system for automatic concatenation detection of SONET channels. In a particular embodiment, customer signal configurations are automatically detected within a bundled connection of channels based on mandatory overhead information and network elements are automatically provisioned along the transmission path based on the signal configuration. Accordingly, the cross-connects for the bundle are automatically provisioned within and across network boundaries along a transmission path. This provides an inter-network solution, minimizes provisioning time and expense and eliminates network provisioning errors.

Another technical advantage of one or more embodiments of the present invention includes providing an automatic concatenation detection method and system that allows the ability to enable and disable alarm reporting and performance monitoring of STSs within the bundle cross-connect. This supports full flexibility for a network operator to manage its channels and connections.

Other technical advantages of the present invention would be readily apparent to one skilled in the art from the following figures, description and claims.

BRIEF DESCRIPTION OF THE DRAWINGS

For a more complete understanding of the present invention and its advantages, reference is now made to the following description taken in conjunction with the accompanying drawings, wherein like numerals represent like parts, and which.

DETAILED DESCRIPTION OF THE INVENTION

Figure 1:
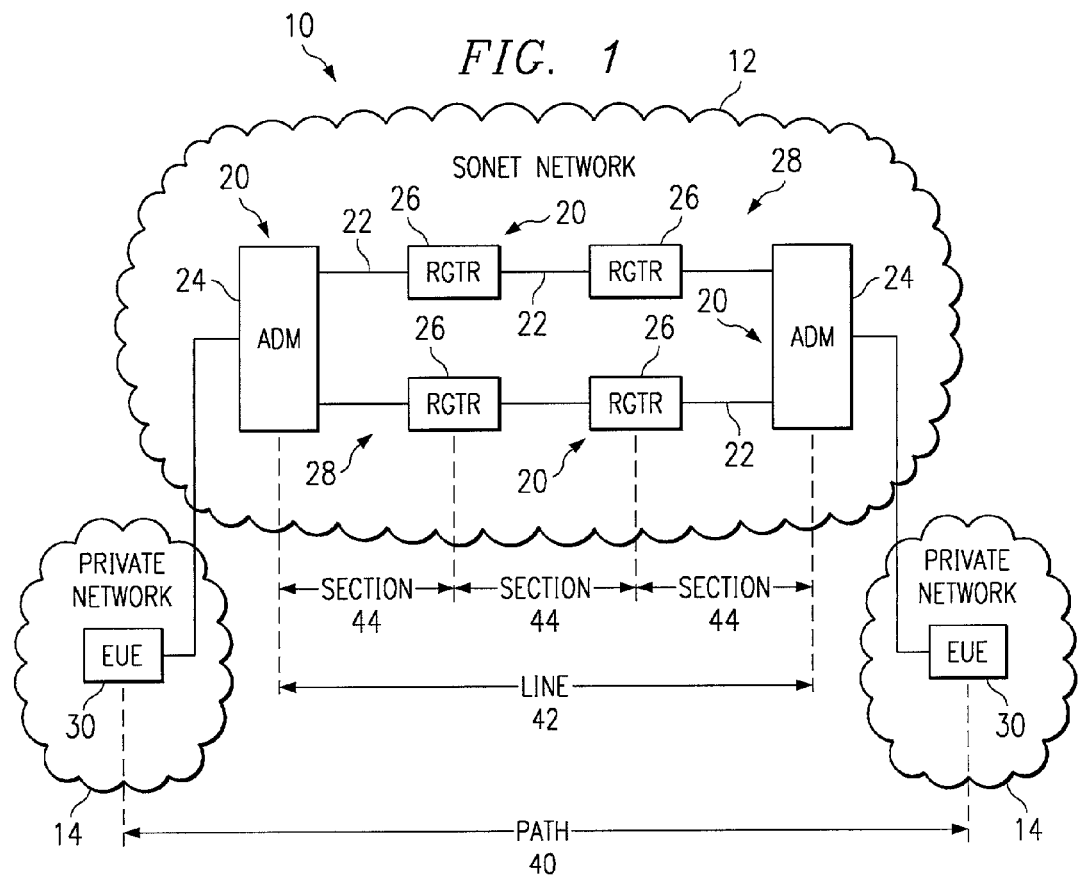
FIG. 1 is a block diagram illustrating a communications system including a synchronous optical network (SONET) network in accordance with one embodiment of the present invention.

FIG. 1 illustrates a communications network 10 in accordance with one embodiment of the present invention. In this embodiment, users communicate video, audio, voice, data and other suitable types of information in assigned time division multiplex channels which may be concatenated to form high bandwidth connections.

Referring to FIG. 1, the communications network 10 includes a synchronous optical network (SONET) network 12 connecting geographically remote private networks 14 of a user, or customer of a service provider operating the SONET network 12. The SONET network 12 includes a plurality of network elements 20 interconnected by fiber optic links 22. In the illustrated embodiment, the network elements 20 include add/drop multiplexers (ADMs) 24 and regenerators (RGTRs) 26. It will be understood that the network elements 20 may instead and/or additionally comprise terminal multiplex (TM), digital cross-connect (DCS)

and other suitable elements capable of transporting and/or processing SONET traffic. At the edge of the SONET network 12, the network elements 20 may translate traffic between the native format of the private networks 14 and the SONET format.

The ADMs 24 receive, cross-connect and transmit traffic within and at the edge of the SONET network 12. The RGTRs 26 regenerate the optical signals for long-haul transport between ADMs 24. In one embodiment, the ADMs 24 and RGTRs 26 are configured to form SONET rings 28. The SONET rings 28 may implement 1+1, 1:1, unidirectional path switch ring (UPSR), bi-directional lines switch ring (BLSR) or other suitable protection configurations.

The private networks 14 each comprise end-user equipment (EUE) 30. The EUE 30 may comprise an Internet, wide area network (WAN) or any other suitable network connecting a plurality of customer devices. For example, the EUE 30 may comprise a edge router connected to a plurality of servers and clients over an Ethernet or other LAN. It will be understood that the private network 14 and/or the EUE 30 may comprise other suitable devices capable of generating, utilizing and/or communicating information over a network.

Customer connections over the network 10 each include one or more time division multiplex channels assigned to the customer. The bandwidth granularity allocated to a customer should follow standard SONET increments. As used herein, the term each means every one of at least a subset of the identified items. One or more channels of a customer may be manually provisioned into connections or, as described in more detail below, be provisioned as a single bundled connection in which case the signal configurations are automatically detected by and provisioned in the ADMs 24 and other line and path termination equipment of the network elements 20. A bundled connection is a plurality of channels assigned to a common customer with no specified signal configuration or traffic mix.

Each connection includes SONET path, line and section transmission segments 40, 42 and 44, respectively. The path segment 40 extends between EUE's 30 or other path terminating equipment. A line segment 42 extends between ADMs 24 or other line terminating equipment. A section segment 44 extends between RGTRs 26, between the RGTRs and ADMs 24 and between other section terminating equipment. Accordingly, each connection includes a path segment 40, one or more line segments 42 across the path segment 40 and one or more section segments 44 across each line segment 42. Further information regarding SONET transport systems is provided by GR-253 and other SONET standards published by Telcordia.

Figure 2:
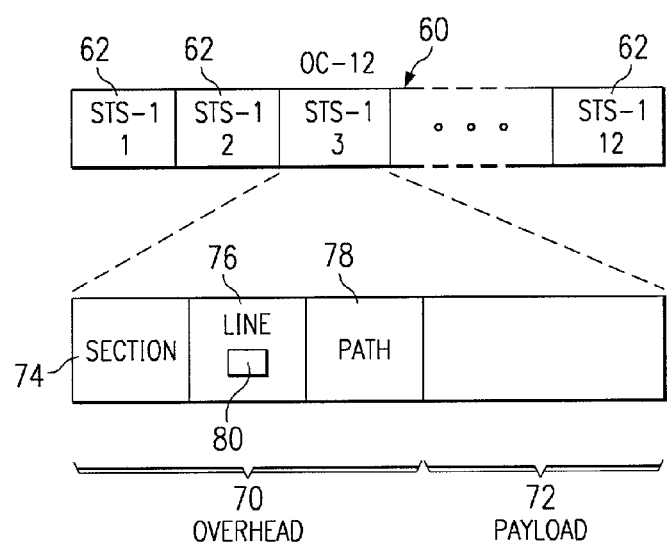
FIG. 2 is a block diagram illustrating a synchronous frame and transport signal segment for transporting traffic in the SONET network of FIG. 1 in accordance with one embodiment of the present invention.

FIG. 2 illustrates a SONET frame 60 for transporting information across the SONET network 12 in accordance with one embodiment of the present invention. SONET defines optical line rates known as optical carrier (OC) signals at a base OC-1 rate which is 51.84 megabytes per second (Mbps). Higher rates are direct multiples of the base rate. Thus, for example, OC-3 runs at 155.52 Mbps, or three times the rate of OC-1.

Referring to FIG. 2, the SONET frame 60 is an OC-12 signal including 12 synchronous transport signal—level 1 (STS-1) channels 62. It will be understood that the SONET frame may be an OC-3, OC-48 or any other suitable OC signal.

Each STS-1 includes an overhead 70 and a payload 72. The overhead 70 includes a section overhead 74, a line overhead 76 and a path overhead 78 corresponding to the SONET section, line and path segments 40, 42 and 44, respectively. The payload 72 includes video, audio, voice, data or other suitable content. The payload content may be in Packet over SONET (POS) or any other suitable format.

The line overhead 76 comprises a plurality of fields including an STS payload pointer field 80. The STS payload pointer field 80 includes a two byte payload pointer that indicates the offset in bytes between the pointer and the first byte in the STS synchronous payload envelope (SPE). The payload pointer is used in all STS-1S to align the STS-1 transport overheads, perform frequency justification and detect STS path alarm indicator signals (AIS-P). The payload pointer includes concatenation indicators generated by the EUE 30.

The STS payload pointer is a mandatory parameter required to be provisioned with data for a valid SONET signal. Accordingly, each user, customer, service provider and network operator transmits the appropriate information in the STS payload pointer field. As described in more detail below, the concatenation indicators are extracted from the STS payload pointer field 80 and used to automatically determine a signal configuration of a bundled connection of channels for a customer. The ADMs 24 and other line and path terminating equipment in the network elements 20 are automatically provisioned to provide cross-connects for the bundled connection based on the extracted information.

Figure 3:
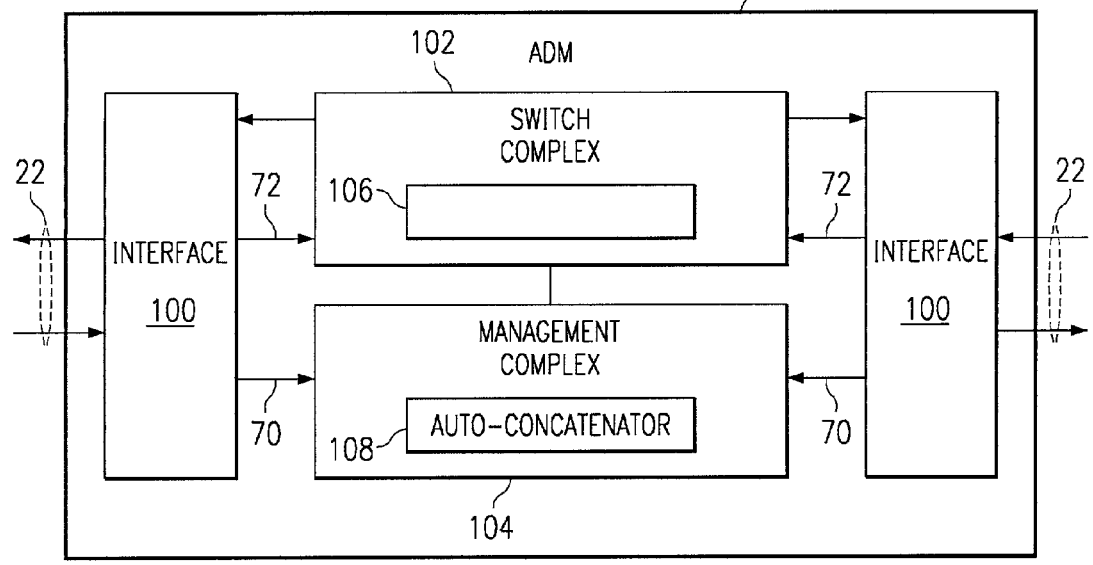
FIG. 3 is a block diagram illustrating details of the SONET add/drop multiplexer (ADM) of FIG. 1 in accordance with one embodiment of the present invention.

FIG. 3 illustrates details of the ADM 24 in accordance with one embodiment of the present invention. In this embodiment, the ADM 24, includes bi-directional interfaces 100, a switch complex 102 and a management complex 104. It will be understood that the ADM 24 may include other standardized and suitable equipment without departing from the scope of the present invention.

The bi-directional interfaces 100, switch complex 102 and management complex 104 may comprise logic encoded in shared or distributed media. The logic comprises functional instructions for carrying out program tasks upon execution. The media comprises computer disks or other suitable computer-readable media, applications specific integrated circuits (ASIC), field programmable gate arrays (FPGA), digital signal processors (DSPs) or other suitable specific or general purpose processors, transmission media or other suitable media in which logic may be encoded and utilized.

Referring to FIG. 3, the interfaces 100 receive and transmit traffic over optical links 22. In one embodiment, the interfaces 100 are SONET tributary interfaces. The interfaces 100 also convert ingress optical signals to electrical signals for processing by the ADM 24 and egress electrical signals to optical signals for transmission in the SONET network 12. The interfaces 100 may be line or local subscriber interfaces.

The management complex 104 is coupled to the interfaces 100 and the switch complex 102. The management complex 104 manages the other components of the ADM 24, provides protection functionality, reports alarm conditions and responds to requests for information from network operators and/or users. Functionality of the management complex may be distributed between components of the ADM 24.

The switch complex 102 receives and switches, or cross-connects traffic between predefined channels. The cross-connects are defined by a switching table 106. The switching table 106 may be manually provisioned by the network operator or automatically provisioned for bundled connections by an auto-concatenator 108 in the management complex 104.

The auto-concatenator 108 includes a table or other record identifying bundled connections and the channels of the connections. Any channel assigned as part of a bundled connection should be considered as unavailable to establish new connections until the deletion of the bundled connection. Bundled connections should be supported for add, drop or pass through connections both uni-directionally or bi-directionally. Connections should be linearly provisioned with a bundled connection.

In operation, an interface 100 receives ingress traffic, converts the traffic from optical to electrical signals and extracts the overhead 70. The interface 100 passes the overhead 70 to the management complex 104 for evaluation of the concatenation indicators by the auto-concatenator 108. The payload 72 is passed to the switch complex 102 for switching.

The switch complex 102 switches the payload 72 in accordance with the instructions in the switching table 106 and outputs the payload 72 to the appropriate interface for transmission to a next network element 20 in the SONET network 12. The auto-concatenator 108 examines the concatenation indicators in the overhead 72 to determine, upon initialization of a bundled connection, provisioning for the switching table 106 or other elements in the switch complex 102 or thereafter whether the signal configuration for a previously provisioned bundled connection has changed necessitating reprovisioning of the switching table 106 of the switch complex 102. In either case, upon detection of an initial signal configuration or a modification to a previous signal configuration by the auto-concatenator 108, the management complex 104 reprovisions switching table 106 in the switch complex 102 in accordance with the new signal configuration. In this way, the traffic format within a plurality of channels assigned to a customer is free to be dynamically changed by the customer without requiring intervention by the service provider.

During operation, customers should have the ability to query and modify settings on a per bundle basis, including identifying the individual connections within a bundle. Performance monitoring (PM) may by default be disabled on individual channels within a bundle with the user having the ability to enable PM reporting and threshold crossing functionality on a per channel basis. Similarly, the reporting of individual path alarms may by default be disabled with the user having the ability to activate this reporting on a per bundle basis.

Figure 4:
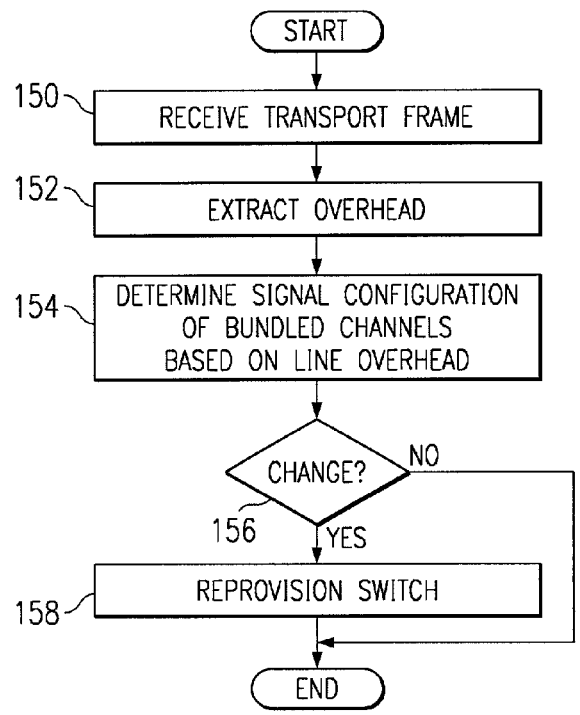
FIG. 4 is a flow diagram illustrating a method for automatic concatenation detection of SONET channels for a bundled connection in accordance with embodiment of the present invention.

FIG. 4 illustrates a method for automatic concatenation detection of SONET channels in accordance with one embodiment of the present invention. The method begins at step 150 in which a SONET transport frame 60 is received at a network element 20. As previously described, the frame is received in an interface and converted from an optical signal to an electrical signal for processing by the network element. It will be understood that the frame need not be converted from optical to electrical if the overhead 70 can be extracted and/or processed in the optical format to determine concatenation of a bundled connection included within the frame.

Proceeding to step 152, the overhead is extracted. For the ADM 24, the overhead 70 is extracted by the interface 100 and passed to the management complex 104. Next, at step 154, the overhead 70 is examined to determine a signal configuration of channels within the bundled connection. In one embodiment, the concatenation indications of the STS payload pointer 80 of the line overhead 76 is examined to determine the signal configuration. It will be understood that other suitable mandatory information within the overhead 70 may be used to determine the signal configuration.

Proceeding to decision step 156, the auto-concatenator 108 determines whether the present configuration for the bundled connection has changed. In one embodiment, the auto-concatenator 108 includes a memory including the last provisioned signal configuration for each set of bundled connections. In this embodiment, the auto-concatenator 108 determines a change by comparing the signal configuration determined from the overhead 70 of the last frame to the stored signal configuration. To account for noise within the network 10, the auto-concatenator 108 may require at least three successive determinations of a new signal configuration from sampled frames before determining that the signal configuration has changed and the switch 102 needs to be reconfigured. The auto-concatenator 108 may require 4, between 5 and 15, or more successive determinations. This ensures that the change is stable. In this embodiment, the auto-concatenator 108 may also store the signal configuration determined from the overhead 70 of the last three or more examined frames 60 to support the determination. On an add, pass through or other suitable connection which an upstream device performs validation, the auto-concatenator 108 may determine that the signal configuration has changed and the switch 102 needs to be reconfigured upon the receipt of a first new signal configuration. It will be understood that each frame may be examined or frames may be periodically examined based on an elapsed period of time or number of frames. Upon recognizing a stable change in signal configuration, the auto-concatenator 108 should reprovision the cross-connects within ten seconds or other reasonable time frame.

At decisional step 156, if a change in the present configuration is detected, the Yes branch leads to step 158 in which the switching table 106 of the switch complex 102 is reprovisioned to provide cross-connects in accordance with the new signal configuration. If no change is detected at decisional step 156, the No branch leads to the end of the process. In this way, the ADM 24 or other network element 20 is automatically provisioned and reprovisioned to account for changes in signal configuration received from customers.

Although the present invention has been described with several embodiments, various changes and modifications may be suggested to one skilled in the art. It is intended that the present invention encompass such changes and modifications as falls within the scope of the appended claims.

What is claimed is:

1. A method for automatic concatenation detection of synchronous optical network (SONET) channels, comprising:
   receiving at a network element a SONET frame including a mandatory overhead and a plurality of channels for a bundled connection;
   automatically determining a signal configuration of the channels within the bundled connection based on the mandatory overhead;
   automatically provisioning the network element to cross-connect the channels within the bundled connection based on the signal configuration determined from the mandatory overhead;
   determining a new signal configuration of the channels within the bundled connection based on the mandatory overhead; and
   automatically reprovisioning the network element to cross-connect the channels in the bundled connection based on the new signal configuration.

2. The method of claim 1, wherein the mandatory overhead comprises a line overhead.

3. The method of claim 2, wherein the line overhead comprises a synchronous transport signal (STS) payload pointer including concatenation indicators, further comprising automatically determining the signal configuration of the channels in the bundled connection based on the concatenation indicators.

4. The method of claim 1, wherein the channels comprise synchronous transport signal-level 1 (STS-1) channels.

5. The method of claim 1, wherein the network element includes a switch with cross-connections provisioned in a switching table, further comprising automatically provisioning the network element to cross-connect the channels in the bundled connection by provisioning the switching table in the switch.

6. The method of claim 1, further comprising:
extracting the mandatory overhead from the SONET frame;
forwarding the mandatory overhead to a management complex in the network element;
determining at the management complex a signal configuration of the channels in the bundled connection based on the mandatory overhead extracted from the SONET frame; and
provisioning a switch in the network element to cross-connect the channels in the bundled connection based on the signal configuration determined from the mandatory overhead.

7. The method of claim 1, further comprising determining the signal configuration is the new signal configuration in response to at least detecting the new signal configuration for a predetermined number of sampled SONET frames.

8. The method of claim 7, wherein the number of sampled SONET frames comprises at least three.

9. The method of claim 1, wherein the signal configuration comprises a plurality of connections in the bundled connection.

10. A system for automatic concatenation detection of synchronous optical network (SONET) channels, comprising:
logic encoded in media;
the logic operable upon execution to receive at a network element a SONET frame including a mandatory overhead and a plurality of channels for a bundled connection, to automatically determine a signal configuration of the channels in the bundled connection based on the mandatory overhead and to automatically provision the network element to cross-connect the channels in the bundled connection based on the signal configuration determined from the mandatory overhead; and
the logic further operable to automatically determine a new signal configuration of the channels within the bundled connection based on the mandatory overhead and to automatically reprovision the network element to cross-connect the channels in the bundled connection based on the new signal configuration.

11. The system of claim 10, wherein the mandatory overhead comprises a line overhead.

12. The system of claim 11, wherein the line overhead comprises a synchronous transport signal (STS) payload pointer including concatenation indicators, the logic further operable to automatically determine the signal configuration of the channels in the bundled connection based on the concatenation indicators.

13. The system of claim 10, wherein the channels comprise synchronous transport signal—level 1 (STS-1) channels.

14. The system of claim 10, wherein the network element includes a switch with cross-connections provisioned in a switching table, the logic further operable to automatically provision the network element to cross-connect the channels in the bundled connection by provisioning the switching table in the switch.

15. The system of claim 10, the logic further operable to extract the mandatory overhead from the SONET frame, to forward the mandatory overhead to a management complex in the network element, to determine at the management complex a signal configuration of the channels in the bundled connection based on the mandatory overhead extracted from the SONET frame and to provision a switch in the network element to cross-connect the channels in the bundled connection based on the signal configuration determined from the mandatory overhead.

16. The system of claim 10, the logic further operable to determine the signal configuration is a new signal configuration in response to at least detecting the new signal configuration for a predetermined number of sampled SONET frames.

17. The system of claim 16, wherein the number of sample SONET frames comprises at least three.

18. The system of claim 10, wherein the signal configuration comprises a plurality of connections in the bundled connection.

19. A communications network, comprising:
a plurality of synchronous optical network (SONET) elements interconnected by fiber optic links; and
each of the SONET elements operable to:
receive a SONET frame including a mandatory overhead and a plurality of channels for a bundled connection;
automatically determine a signal configuration of the channels within the bundled connection based on the mandatory overhead;
cross-connect the channels within the bundled connection based on the signal configuration determined from the mandatory overhead;
determine a new signal configuration of the channels within the bundled connection based on the mandatory overhead; and
cross-connect the channels in the bundled connection based on the new signal configuration.

20. A method for provisioning cross-connections in a synchronous optical network (SONET) network, comprising:
assigning a plurality of consecutive SONET synchronous transport signal (STS) channels to a customer without specifying a traffic mix of the channels;
automatically detecting based on a line overhead the traffic mix of the SONET STS channels at each network element along a transmission path in the SONET network; and
each network element automatically provisioning its own cross-connects for the SONET STS channels based on the traffic mix detected from the line overhead.

21. The method of claim 20, wherein the traffic mix is detected based on synchronous transport signal (STS) payload pointer bytes of the line overhead.

22. The method of claim 21, wherein the traffic mix is detected based on concatenation indicators in the STS payload pointer bytes.

* * * * *